3,847,989
EXOTHERMIC CATALYTIC HYDROGENATION OF ORGANIC COMPOUNDS IN A LIQUID REACTION MEDIUM
Rolf Platz, Mannheim, Otto Nagel, Hambach, and Werner Fuchs, Ludwigshafen, Germany, assignors to Badische Anilin- & Soda-Fabrik Aktiengesellschaft, Ludwigshafen (Rhine), Germany
Filed Sept. 17, 1969, Ser. No. 858,808
Claims priority, application Germany, Sept. 19, 1968, P 17 93 452.0
Int. Cl. C07b 1/00
U.S. Cl. 260—570.9                          4 Claims

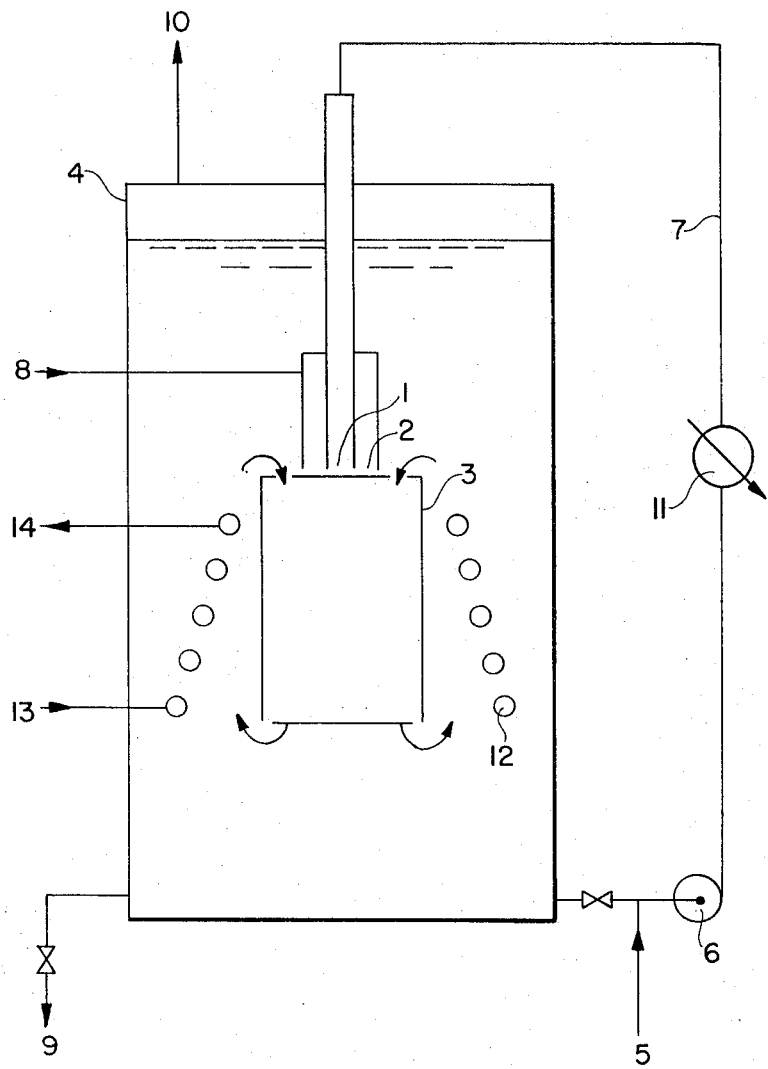

ABSTRACT OF THE DISCLOSURE

A process for heat withdrawal in catalytic hydrogenation processes in the presence of molecular hydrogen in a liquid reaction medium using dissolved or suspended catalysts, in which during the hydrogenation some of the reaction medium is withdrawn and recycled to the reaction medium at the point of entry of the hydrogen which is situated beneath the surface of the liquid at a speed of 5 to 100 meters per second and is introduced into a chamber situated in the reaction medium and extending in the direction of entry of the recycled liquid, the inlet opening of said chamber having a mean diameter which is two to twenty times the mean diameter of the liquid nozzle, and the length of said chamber being from three to thirty times its hydraulic diameter.

---

The present invention relates to a new process for the withdrawal of heat in catalytic hydrogenation processes in the liquid phase using dissolved or suspended catalysts.

It is known that, when hydrogenation processes are carried out on a commercial scale, the heat of reaction usually has to be withdrawn because undesirable secondary reactions may take place at elevated temperatures and a correspondingly higher hydrogen pressure is necessary to complete the reaction at elevated temperature, i.e. for example when carrying out the reaction adiabatically. Elevated pressures of hydrogen are however a substantial cost factor in all hydrogenation processes. They also involve greater risks and therefore require additional safety precautions (cf. Kirk-Othmer, Encyclopedia of Chemical Technology, vol. 7 (1951), 1st edition, pp. 694, 708, 709). In conventional industrial catalytic hydrogenation processes the problem of withdrawing the heat of hydrogenation has not been satisfactorily solved.

It is an object of the invention to provide a process for the withdrawal of heat in catalytic hydrogenation processes in which the heat of hydrogenation can be efficiently withdrawn even in strongly exothermic reactions.

Another object of the invention is to provide a process in which the hydrogenation can be carried out with higher space-time yields than in prior art methods.

In accordance with this invention these and other objects and advantages are achieved in a process for the withdrawal of heat in catalytic hydrogenation processes in the presence of molecular hydrogen in a liquid reaction medium using dissolved or suspended catalysts, in which during the hydrogenation some of the reaction medium is withdrawn and recycled to the reaction medium at the point of entry of the hydrogen which is situated beneath the surface of the liquid at a speed of from 5 to 100 meters per second and is introduced into a chamber (located in the reaction medium and extending in the direction of entry of the recycled liquid) whose inlet opening has a mean diameter from two to twenty times the mean diameter of the liquid nozzle and whose length is from three to thirty times its hydraulic diameter.

According to the new process it is possible, surprisingly, to carry out catalytic hydrogenation processes at a lower pressure than has hitherto been possible for the same reaction.

In accordance with the process of the invention catalytic hydrogenation processes may be carried out using dissolved or suspended catalysts. Practically all conventional hydrogenation catalysts can be converted into sufficiently finely divided form to be used for the new process. Examples of suitable catalysts are metallic platinum, palladium, rhodium, ruthenium, nickel and cobalt which may be applied to carrier materials, such as active carbon, barium sulfate, calcium carbonate, silica gel, aluminum oxide. According to the new process conventional catalytic hydrogenation processes may be carried out, for example hydrogenation of carbon-carbon triple and double bonds, of aromatic rings, of carbonyl groups, of nitro groups, of nitrile groups, of oximes, of amino-oxide groups, the hydrogenolysis of protective groups, such as benzyl ester groups or benzyl ether groups, and the hydrogenolysis of acid chlorides to aldehydes.

Liquids conventionally used for catalytic hydrogenation, such as ethers, esters, lower carboxylic acids, alcohols and water, may be used as solvents or diluents for the process according to this invention.

The reactions are generally carried out at the usual temperatures for catalytic hydrogenation processes. The process may be carried out at the pressures hitherto conventionally used in catalytic hydrogenation processes. In general, especially in the pressure range below about 100 atmospheres, the pressures required are lower than are usually employed in prior art catalytic hydrogenation methods.

It is an essential feature of the new process that the recycled reaction liquid has a speed of entry of 5 to 100 m./sec., preferably of 10 to 40 m./sec. Such speeds can be achieved for example by using nozzles having for example a circular hole, a slot or an annular gap. Hydrogen and the reaction liquid may be introduced into the reactor from two separate openings located side by side or from two concentric openings, the direction of entry and the speed of the gas being chosen at will. The ratio of the volume of liquid withdrawn from the reactor and supplied to it as recycle to the volume of hydrogen (STP) supplied is generally from 1:5 to 1:0.1.

The suspended catalyst may be separated from the portion of reaction medium to be recycled before the said portion is withdrawn, for example by filtration or sedimentation. Generally, however, the catalyst is allowed to circulate with the reaction liquid.

The reaction liquid recycled at the said speed is introduced into a chamber situated in the reaction medium and extending in the direction of entry of the liquid supplied, which chamber has an inlet opening whose mean diameter is two to twenty times, preferably twice to ten times, the mean diameter of the liquid nozzle and which has a length which is three to thirty, preferably five to fifteen, times its hydraulic diameter.

The expression "liquid nozzle" means the outlet for the liquid. By "mean diameter" we mean the diameter of a circle which has the same cross-sectional area as the relevant cross-section of the nozzle or inlet opening of the chamber situated medium. This chamber, which will hereinafter be referred to as the impulse exchange chamber, generally has a constant cross-section or a cross-section which increases in the direction of flow. The impulse exchange chamber should extend in the direction of entry of the liquid and may have various shapes, its shape advantageously corresponding to the shape of the nozzle used. Cylindrical tubes or cone segments are generally used. When the impulse exchange chamber is in the form of a cylindrical tube, its length should be from twice to thirty times its diameter. When the impulse exchange chamber does not have a circular cross-section or a cross-section which is constant throughout its length, its length should be twice or thirty times, preferably three to ten times the hydraulic diameter. Hydraulic diameter is defined as the diameter of a cylindrical tube which exhibits the same pressure loss as the impulse exchange chamber in question for the same throughflow and the same length.

Instead of a single nozzle for the gas and liquid supplied and a single impulse exchange chamber, a group of tubes and a group of impulse exchange chambers may be used, it being advantageous to use nozzles of the same size. The volume of the impulse exchange chamber is as a rule only a small portion of that of the actual reaction chamber. The direction in which the liquid is introduced is not critical but, when a suspended catalyst which tends to settle is used the downward direction is preferred. In this case, the distance between the bottom of the reactor and the impulse exchange chamber is advantageously between half and three times the length of the latter. When homogeneously dissolved or very finely divided catalysts are used, the distance between the impulse exchange chamber and the bottom of the reactor may be varied within wide limits and it may be advantageous to allow the jet of liquid to enter upwardly because the flow of the gas and the ascent of the gas in the liquid are in the same direction and the circulation of liquid can thus be increased.

The substance to be hydrogenated is generally in dissolved and/or suspended form in the reaction liquid. It is possible to place the whole of the starting material in the reactor at the beginning of the hydrogenation or to add it gradually during the hydrogenation to the reaction medium. If the substance to be hydrogenated is gaseous, it is advantageously premixed with the hydrogen and supplied to the reaction medium as a gas mixture or added in the vicinity of the outlet for the hydrogen, for example using a three-component nozzle.

The new process may be carried out batchwise or continuously. If the process is carried out continuously, the quantities of feed supplied and of product withdrawn should correspond.

Hydrogenation takes place mainly in the interior of the impulse exchange chamber. Since a strong circulation of reaction liquid (which is ten to one hundred times the amount of liquid supplied through the nozzle) is induced by the jet of liquid entering the impulse exchange chamber, the heat generated is immediately dissipated in a large amount of liquid and may be withdrawn for example in cooling means situated outside the impulse exchange chamber or by circulating some of the reaction medium in a cooler arranged outside the reactor.

In the process according to the invention it is possible to add hydrogen only at the rate at which it is used up for the reaction so that the offgas formed consists substantially only of inert gases which may be present in the hydrogen or of gaseous hydrogenation products, for example in the hydrogenation of gases. Compressors and equipment for recycling hydrogen which are necessary in prior art industrial hydrogenation processes are unnecessary in the above method. Since it is not necessary to recycle the hydrogen, it is also posisble to use less pure hydrogen for the hydrogenation because inert constituents can be discharged as offgas after a single pass so that they do not accumulate in the recycle gas as in conventional methods.

It may however also be advantageous to use an excess of hydrogen, for example in order to remove volatile reaction products (for example hydrogen chloride in the hydrogenolysis of acid chlorides) or to use an excess of hydrogen for a hydrogenation at lower pressure.

The drawing illustrates the process according to the invention. For the sake of clarity, the nozzles and the impulse exchange chamber have been exaggerated in size as compared with the reactor. 1 denotes the outlet for the recycled portion of the reaction medium, 2 denotes the outlet and 8 the supply line for hydrogen (with or without a gaseous starting material), 3 denotes the impulse exchange chamber, 4 the reactor, 5 the supply line for the substance to be hydrogenated continuously or batchwise, 6 denotes the pump which withdraws some of the reaction medium and recycles it through line 7 (with or without cooling in the cooler 11), 9 denotes the outlet for the reaction product, 10 the outlet for the offgas and/or excess hydrogen, 12 a cooling means, 13 the supply line for coolant and 14 the withdrawal line for coolant.

The invention is illustrated by the following examples.

EXAMPLE 1

2 liters of 30% by weight aqueous butynediol solution and 100 g. of Raney nickel are charged into a reactor having a diameter of 100 mm. 200 liters per hour of liquid containing suspended catalyst is withdrawn from the reactor at atmospheric pressure and recycled vertically in a downwards direction into the reactor by means of a pump through a nozzle having a diameter of 1.5 mm. at a speed of 20 meters per second. At a distance of 2 mm. from the nozzle there is a cylinder having an internal diameter of 12 mm. and a length of 80 mm. which extends in the direction of entry of the liquid to within 100 mm. above the bottom of the reactor. No catalyst settles at the bottom of the reactor with this arrangement. 20 liters of hydrogen per hour is passed at 90° C. through an annular gap concentric with the liquid nozzle and having a width of 1 mm. The amount of offgas is less than 0.5 liter per hour. The temperature in the reactor is controlled by means of a water jacket surrounding the reactor. The maximum temperature in the reactor should prevail at the lower end of the cylinder. In this case, however, there is no difference between the temperature prevailing here and the temperature measured at a second point near the surface of the liquid. After twenty hours the absorption of hydrogen slowly decreases and after thirty-five hours it ceases. Gas chromatographic analysis of the solution reveals butanediol in addition to a little butanol and traces of other impurities.

When, on the other hand, the same hydrogenation is carried out at the same temperature at atmospheric pressure in a shaking device, only 1.7 liters of hydrogen is absorbed in the first hour.

EXAMPLE 2

A mixture of 2 moles of benzonitrile, 2,600 ml. of ethanol, 2 moles of 36% by weight hydrochloric acid and 200 g. of catalyst (5% by weight of palladium on animal charcoal) is charged into a reactor. 60 liters per hour of this suspension is withdrawn from the reactor by means of a pump and recycled to the reactor through a glass nozzle having a 1 mm. orifice. Hydrogen is supplied through an annular gap 1 mm. wide surrounding this nozzle. The liquid issuing from the nozzle enters a cylindrical tube having a diameter of 12 mm. and a length of 70 mm. The reactor is kept at 20° C. by a thermostated double jacket with water circulating through it. Absorption of hydrogen is 2 moles after 1 hour and 2.6 moles after two hours. The experiment is discontinued after five hours, the hydrogen absorption being 80% of the theory, and the reaction mixture is worked up by concentration and precipitation of the benzylamine hydrochloride formed with ether. 160 g. of pure benzylamine hydrochloride is isolated, equivalent to 95% with reference to hydrogen absorbed.

If in a comparative experiment hydrogen is introduced in excess through a fritted glass disc and the catalyst is kept in suspension by vigorous stirring, only 38 g. of benzylamine hydrochloride is obtained under otherwise analogous reaction conditions.

EXAMPLE 3

A mixture of 420 g. of benzoyl chloride, 2,500 ml. of xylene and 150 g. of catalyst (5% by weight of palladium on barium sulfate) is hydrogenated according to Rosenmund in the same apparatus as in Example 2. The reactor is kept at 110° C. by means of a thermostated double jacket. No local difference in temperature can be measured within the reaction chamber during the hydrogenation. 2.1 moles of hydrogen are absorbed after two hours. The hydrochloric acid formed is titrated for purposes of control; it is 93% of the amount theoretically expected.

If circulation of the liquid through the nozzle in the reactor is stopped during this experiment, the absorption of hydrogen declines to a value which cannot be measured.

In another comparative experiment a mixture of 410 ml. of xylene, 70 g. of benzoyl chloride and 25 g. of the catalyst described in paragraph 1 of this example is hydrogenated in a shaking device. The hydrogen absorption is only 5.1% of the theory after two hours at 110° C.

We claim:

1. A process for carrying out an exothermic catalytic hydrogenation with molecular hydrogen of a carbon-carbon triple or double bond, an aromatic ring, a carbonyl group, a nitro group, a nitrile group, an oxime group, an aminoxide group, an acid chloride group, a benzyl ester group, or a benzyl ether group of an organic compound in an exothermic reaction in a body of liquid having suspended or dissolved therein a solid, finely divided hydrogenation catalyst of a catalytic metal selected from the group consisting of platinum, palladium, rhodium, ruthenium, nickel and cobalt, which comprises withdrawing a portion of said liquid from said body, recycling the withdrawn portion by introducing the latter through a first nozzle into said body of liquid at a point below the surface of said body and into a small cylindrical tube immersed in said body and having an inlet, introducing hydrogen through another nozzle in said body of liquid and into said inlet opening, the recycled liquid having a velocity of 5–100 meters per second at its point of introduction into said body, the ratio of the volume of the recycled liquid to the volume of hydrogen introduced through their respective nozzles being from 1:5 to 1:01, the exothermic hydrogenation action occurring in said cylindrical tube as the hydrogen and liquid jet from the inlet opening of said tube and through said tube, inducing by the jetting action of said liquid in said body of liquid in said cylindrical tube a circulation of additional liquid drawn through said cylindrical tube in an amount of about 10 to 100 times the amount of the recycled liquid supplied through said first nozzle, said additional liquid so drawn dissipating immediately the heat of the exothermic hydrogenation action in said cylindrical tube, and the inlet opening of said tube having a mean diameter of 2 to 20 times the mean diameter of said first nozzle and the cylindrical tube having a length of 3 to 30 times its hydraulic diameter.

2. A process as claimed in claim 1, and cooling the recycled liquid outside said body of liquid prior to its return to said body via said first nozzle.

3. A process as claimed in claim 1, said velocity of said recycled liquid being 10 to 40 meters per second.

4. A process as claimed in claim 1 wherein said hydrogenation catalyst is one of said catalytic metals on a finely divided, solid carrier.

References Cited

UNITED STATES PATENTS

| | | | |
|---|---|---|---|
| 3,755,452 | 8/1973 | Sinn et al. | 260—586 B |
| 2,481,245 | 9/1949 | Scharmann et al. | 260—580 |
| 2,547,274 | 4/1951 | Linn | 260—690 X |
| 2,620,356 | 12/1952 | Munday | 260—580 |
| 2,857,432 | 10/1958 | Joris | 260—690 X |
| 3,041,377 | 6/1962 | Harast | 260—580 |
| 3,255,252 | 6/1966 | Gold | 260—580 X |
| 3,414,386 | 12/1968 | Mattix | 260—690 X |
| 3,498,103 | 11/1969 | Hann | 260—583 |
| 1,828,146 | 10/1931 | Joseph | 23—288 R |
| 1,909,442 | 5/1933 | Williams | 23—288 R X |
| 3,354,079 | 11/1967 | Van Driesen | 23—288 R X |
| 3,522,017 | 7/1970 | Barfield | 23—288 R X |

FOREIGN PATENTS

| | | | |
|---|---|---|---|
| 1,031,717 | 6/1966 | Great Britain | 23—288 R |

FLOYD D. HIGEL, Primary Examiner

U.S. Cl. X.R.

23—288 R, 288 A, 288 D, 288 S, 287, 289, 290, 291; 260—409, 580, 583M, 599, 635, 683.9, 689, 690